July 8, 1941.  C. PACK  2,248,461
MULTIPLE DIE FOR COMPOSITE ARTICLES
Filed May 6, 1938   2 Sheets-Sheet 2
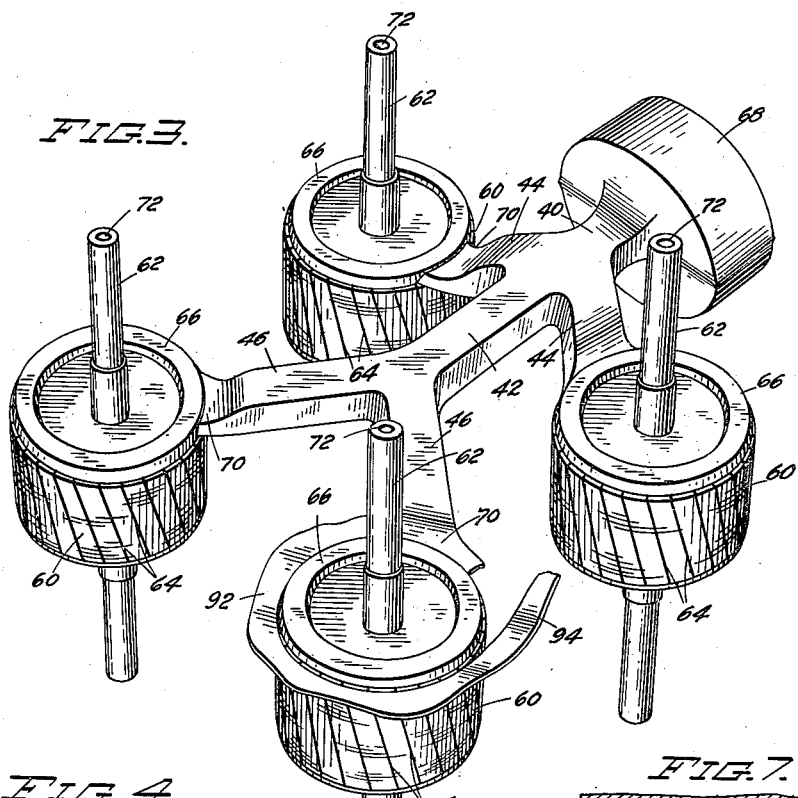
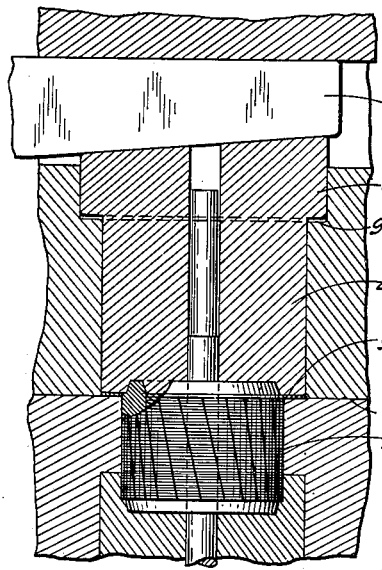
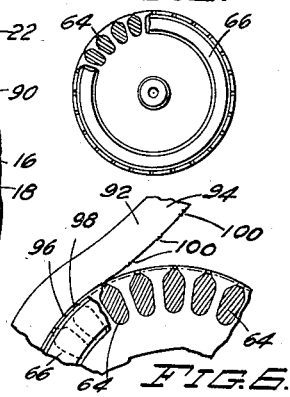
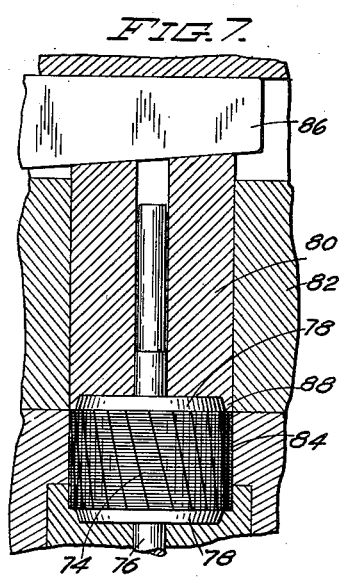
INVENTOR
CHARLES PACK
BY
James F. Franklin
ATTORNEY Patented July 8, 1941

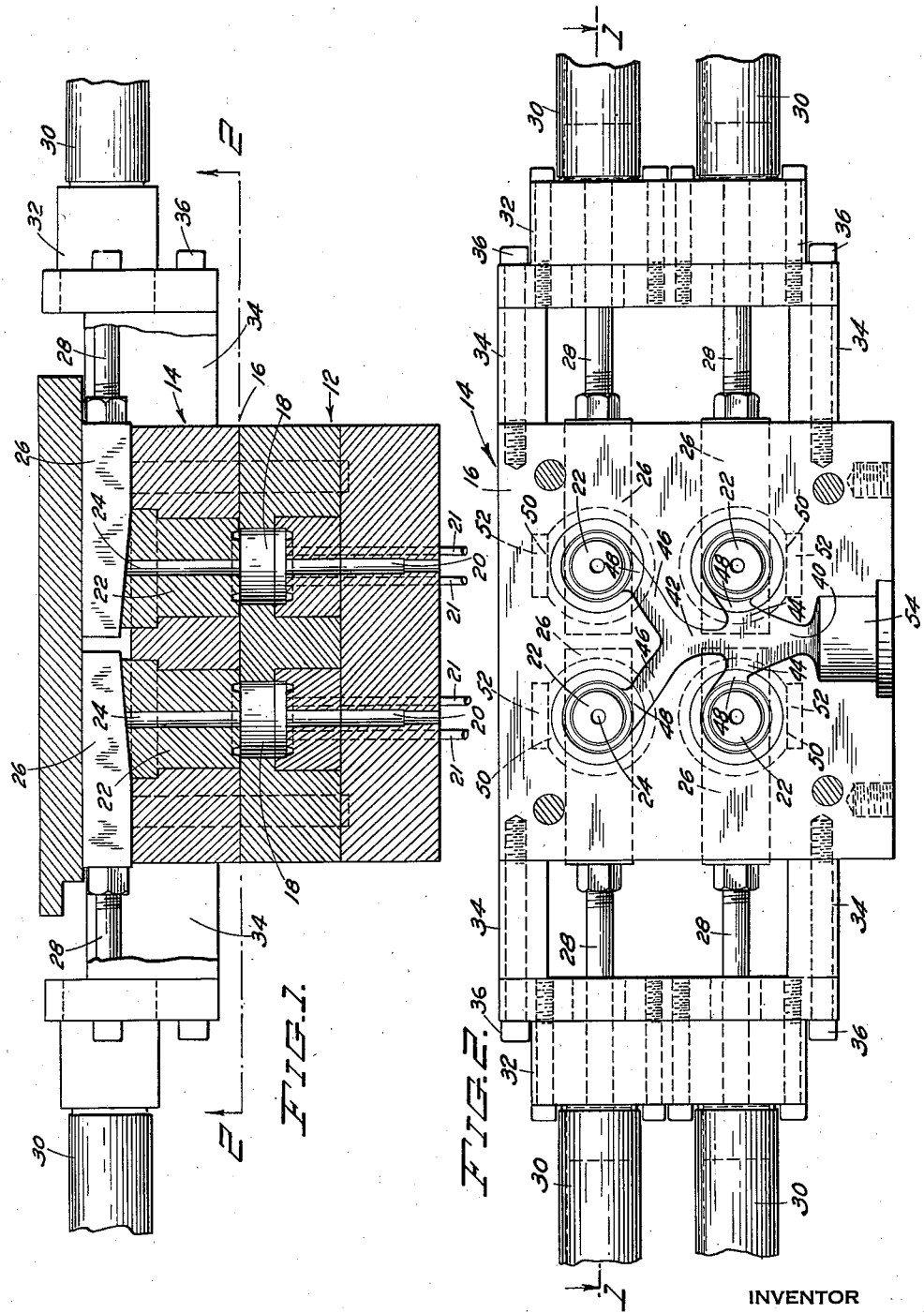

2,248,461

UNITED STATES PATENT OFFICE 2,248,461

MULTIPLE DIE FOR COMPOSITE ARTICLES

Charles Pack, Forest Hills, N. Y., assignor to Doehler Die-Casting Co., New York, N. Y., a corporation of New York Application May 6, 1938, Serial No. 206,334

8 Claims. (Cl. 22—149)

This invention relates to molding, and more particularly to a multiple mold for molding a composite article, part of which is molded onto another part which is somewhat variable in dimension.

The primary object of my invention is to generally improve dies, especially multiple dies. A more particular object is to provide an improved multiple die for molding a composite article the molded part of which is molded onto a previously fabricated part, said latter part being somewhat variable or inaccurate in dimension. The invention deals most importantly with die-casting, especially of composite articles in which the non-die-cast part consists of a stack of laminations, for it is particularly difficult, if not impossible, to accurately determine the dimension of the stack of laminations in a direction perpendicular to the laminations.

The invention is disclosed as applied to the molding of the squirrel cage portion of a rotor for an induction motor or like electrical product. Die-cast rotors have long been made, these consisting of a stack of circular peripherally-slotted laminations through the slots of which a suitable conductive aluminum alloy is die-cast, together with rings at the ends of the rotor, these rings connecting the bars of the squirrel cage. The complete die-cast squirrel cage, that is, the bars and rings, function to hold the laminations compressed together and also to hold them in desired registration. This registration is, in many cases, a helical registration, and the rotor illustrated in the present application is of this character, but for brevity, the relation between the rotor laminations will be referred to simply as "registration."

Heretofore, it has been essential to die-cast only a single rotor at a time. This is so because of the variation or indefiniteness in the axial length of the rotor. It is impossible to obtain an exact dimension because of variation in the thickness of the laminations, inasmuch as for reasonable cost, ordinary stock is used and not special precision stock. Moreover, an oxide coating is provided on the laminations in order to insulate the same against eddy current flow, and this coating may vary in thickness. Other factors contribute to the indefiniteness of axial dimension, such as the fact that the laminations may be warped slightly. Finally, the disks are subject to compression in building the rotor, and this compression may vary with resulting indefiniteness in axial dimension. Because of all these facts, it is customary to specify the number of laminations as "plus or minus 1," the operator varying the number of laminations in an effort to approach the desired axial dimension.

Heretofore the customary practice was as follows: The laminations were put into registration and were then clamped together by a bolt passing through the center hole or shaft hole in the laminations. The bolted stack of laminations was then put in a die having an ejector portion receiving the rotor laminations and a cover portion having a series of small gate holes distributed in a circle in the cover portion and leading directly to the die-cast conductor ring at the end of the rotor. The cover die was, of course, a very thin die in view of the smallness of the individual gates or passages leading therethrough to the rotor. Because of the thin cover die, it was not practicable to receive the shaft of the rotor through or in the cover die, this shaft ordinarily projecting beyond the ends of the rotor for a substantial distance. It was therefore not possible to mold the rotor with the rotor shaft in place. Instead, the laminations were preliminarily and temporarily bolted together, without the shaft, as mentioned above. After the die-casting operation was completed, it was necessary to remove the bolt. With the bolt removed, the laminations were held together by the die-cast cage. Then the shaft had to be driven in place. It was not considered feasible to use a high die-casting pressure, and a low pressure was used, this being possible because of the small length and large total cross-sectional area of the multiple gates.

The necessity for molding the rotors one at a time increased the molding expense and this was an important factor, especially when dealing with small rotors which might, from the standpoint of their size alone, be readily and advantageously molded in a multiple mold.

Further objects of the present invention center about the molding of die-cast rotors, and the primary object resides in the provision of a multiple die for simultaneously molding a plurality of rotors despite variations in the axial length of the same. Another object is to provide such a die adapted to mold rotors which have already been provided with their rotor shafts, thus eliminating the bolting and unbolting of the laminations. Still another object is to make it possible to die-cast the rotors under high pressure, thereby producing a dense solid casting, and making it possible to gate the multiple mold with a simple branch gate of conventional character, despite the complex shape of the squirrel cage casting.

Still another object is to adapt the die for the molding of rotors in which the conductive rings at the ends of the motor have a diameter nearly equal to the diameter of the rotor.

In general, the idea underlying the invention is to make the multiple cavity die with plugs or inserts which are individually and independently movably mounted at each die cavity and which are backed by means for moving the same tightly against their respective rotor laminations. The plugs are preferably moved and backed by a self-locking member such as a wedge (by which I mean to include special forms of wedge, such as a cam or screw), there being independently movable wedges for each of the plugs, said wedges preferably being actuated by individual hydraulic rams or piston and cylinder mechanism. In effect, the plugs act as individual cover dies for each mold cavity, and the plugs are preferably made long enough to receive the long shaft of the rotor.

To the accomplishment of the foregoing and such other objects as will hereinafter appear, my invention consists in the multiple die elements and their relation one to the other, as hereinafter are more particularly described in the specification and sought to be defined in the claims. The specification is accompanied by drawings, in which:

Fig. 1 is a section through a multiple die embodying features of my invention;

Fig. 2 is an elevation looking at the parting face of the cover die, this view being taken in the plane of the line 2—2 of Fig. 1;

Fig. 3 is a perspective view of the casting as removed from a multiple die having four mold cavities;

Fig. 4 is an enlarged section through the die at one of the mold cavities and is explanatory of the operation of the invention;

Fig. 5 is an end elevation of the finished rotor with a part of the die-cast conductive ring cut away to show the bars or slots of the rotor;

Fig. 6 is a detail explanatory of the ease of removal of an annular fin formed on the casting; and Fig. 7 is a section similar to Fig. 4, but through a die modified for the die-casting of rotors in which the squirrel cage rings are smaller in diameter than the rotor by an amount sufficient to permit simplification of the die.

Referring to the drawings, and more particularly to Figs. 1 and 2, the multiple die there shown has only four die cavities, but the principles of the invention may be applied to a die having a greater number of cavities. In the present case, I provide relatively movable ejector and cover dies 12 and 14, these being separable at parting face 16. Ejector die 12 is provided with a plurality of cylindrical mold cavities 18 dimensioned to receive the rotors. The ejector die is also cut away, as indicated at 20, to receive one end of the rotor shafts. It is, of course, provided with appropriate ejector pins 21, there being three for each rotor in the present case.

The cover die 14 is provided with a plurality of cylindrical plugs or inserts 22. These are cut away at 24 to receive the other end of the rotor shafts. The plugs 22 are axially movable, that is, they are movable toward or away from ejector die 12, or, more specifically, toward or away from their respective mold cavities 18. In this way, variations in axial length of the individual rotors may be accommodated.

I provide means associated with each of the plugs 22 for urging the same tightly against its respective rotor. In the present case, this means includes a wedge 26 disposed in back of plug 22, said wedge being slidable transversely of the plug. The wedge is connected through piston rod 28 to a hydraulic ram disposed in hydraulic cylinder 30. The hydraulic cylinders are mounted on supports 32 bearing against spacer blocks 34 and held in assembled position by bolts 36. The upper ends of plugs 22 are preferably sloped to mate with the sloping surfaces of wedges 26, as is clearly shown in Fig. 1 of the drawings. The wedge angle is preferably made comparatively small, this being readily done because the amount of movement needed for each plug is small. The slight angle of the wedge makes it self-locking, and this is desirable, though not at all essential. It is desirable when using a high casting pressure because the hydraulic rams need only be large enough to sufficiently compress the rotor laminations before subjecting the die cavity to the molding pressure. The rams need not be large enough to withstand the additional load of the die-casting pressure when using self-locking wedges.

Although it is simple and convenient to use straight-line movement for the wedges, as shown, it will be understood that the individual plugs may be moved by other means, such as screws or cams which, properly considered, are merely special forms of wedge. The plugs may also be backed up by stiff compression springs, but I do not recommend the use of springs for they are suitable only with low molding pressures, whereas I deem the use of a high molding pressure of particular advantage when molding a complex casting of the character here involved in order to properly fill out all of the long, slender passages or slots for the rotor bars with a flawless filling of dense metal.

The die cavities are gated by any appropriate branch gate, the gate preferably being made adequate in cross-section to insure free flow of metal to the individual cavities. The gate may be formed on the parting face of the ejector die, but in the particular die here illustrated, the gate has been formed in the cover die. The nature of the gate is clearly shown in Fig. 2, in which it will be seen that the metal flows through stem 40, 42, and into branches 44 and 46, leading to the mold cavities. With the gate formed in the cover die, the gate passes through the edge of plugs 22, these being cut away as indicated at 48. This would not be necessary when cutting the gate in the parting face of the ejector die instead of in the parting face of the cover die. Because the gates are cut through the plugs, it is necessary to guard against rotation of the plugs in the cover die. This precaution is anyway desirable when using a sloping outer end for the plugs, such as is here employed. The outer or large diameter ends of the plugs are flattened at 50 and mate with inserts 52 received in appropriate recesses cut in the cover die. This construction prevents rotation of the plugs without interfering with the desired axial movement.

In the present case, the particular die here illustrated is designed for use in a die-casting machine of the type in which the molten metal is ejected into the die by means of a plunger operating in a cylinder or receptacle connected directly to the die. It is for this reason that the semi-cylindrical passage 54 is shown in Fig. 2, and it will be understood that a mating semi-cylindrical passage is provided on the parting face of the ejector die, thus providing a complete cylindrical passage when the die is closed. The complete cylindrical passage is not the actual working cylinder which receives the metal ejecting plunger, but it forms a continuation or extension thereof.

Referring now to Fig. 3, I there show the casting or product as removed from the die, and before breaking the individual rotors from the gate. Each rotor consists of a stack of laminations 60 carried on a rotor shaft 62. The laminations are peripherally slotted, the nature of the slots being shown at 64 in Fig. 5. The die-cast metal fills the slots 64 and also connects the same by integrally cast rings 66 formed at the ends of the rotor. The rotors are connected to gate branches 44 and 46, and these are connected by stem 40 and 42. The residue of metal left in the cylinder at the end of the plunger stroke is indicated at 68. The gate branches are sharply thinned or necked down at the points of connection 70 with the rotor, and the rotors are therefore readily broken away from the gate, after which the gate may be remelted for further use while the rotors are suitably finished by means of a comparatively light cut in a lathe, the center holes 72 of the rotor shafts 62 being again used for this purpose.

The operation of the die as so far described will be clear by reference to Fig. 7 of the drawings. In that figure, I show a laminated rotor 74 carried on a rotor shaft 76. The die-cast rings of the squirrel cage are indicated at 78. In this case, the plug or insert 80 of cover die 82 is given a diameter equal to that of the rotor 74. The arrangement is such that the insert 80 will fit within and can move down into the die cavity 84. The cavity is given an axial length equal to the desired length of rotor, and slight variations in axial length of the rotor are accommodated by axial movement of plug 80 under the influence of wedge 86. If the rotor length is greater than normal, the end of plug 80 will not reach the parting face between the ejector and cover dies, and if the rotor length is less than normal the plug 80 will move somewhat beyond the parting face into the die cavity. The variations in length are too small to interfere with the flow of metal through the gate into the die cavity.

In Fig. 7, it will be noted that the periphery 88 of the plug 82 is a comparatively thin wall of metal. In many cases, the desired diameter of the ring 78 approaches the diameter of the rotor even more closely than is shown in Fig. 7, thus necessitating a reduction in wall thickness at the point 88 until it becomes too thin a wall to stand up well under long continued use of the die. For this reason, the die construction shown in Figs. 1 and 2 is modified somewhat compared to that shown in Fig 7, and the modification may be explained with reference to Fig. 4. In that figure, it will be seen that the plug 22 is substantially larger in diameter than the die cavity 18, thus avoiding a thin edge at the periphery of the plug and instead substituting the broad durable end 90. With this construction, it is impossible for plug 22 to enter the mold cavity 18. The furthest it can move is to about the parting face 16. In practice, the axial length of the mold cavity is made equal to the minimum permissible dimension of the rotor. When the rotor is placed in the die cavity, it ordinarily projects slightly above parting face 16, as is shown in Fig. 4. In this way, the plug 22, when forced downwardly by wedge 26, is enabled to exert the desired compression of the rotor laminations. A slight space is left between the end of plug 22 and the parting face 16 of the ejector die, and in this space an annular fin of metal may be formed. The thickness of this fin depends upon the projection of the rotor out of the die cavity, and the maximum thickness is equal to the tolerance permitted for variation in the axial length of the rotor. It will be noted that a space exists at 91 between the enlarged part 23 of plug 22 and the mating part of the cover die, this space being equal to or greater than the space at the inner end of the plug so that the plug may move all the way into direct pressure engagement with the parting face 16 of the ejector die. This space is not so clearly evident in Fig. 1 because there the die is empty and the plugs are assumed to have been moved all the way to the ejector die.

Referring to Fig. 3, one such annular fin is shown at 92 on the lowermost rotor. This fin causes no difficulty in manufacture because it is readily torn away from the rotor, as is indicated at 94. The reason it is readily torn away will be clear from inspection of Figs. 3 and 6, in which it will be seen that fin 92 is connected to the rotor solely at the thin exposed edge of the rotor slots. Thus, in Fig. 6, the fin 92 is not directly connected to the die-cast ring 66, for the endmost lamination of the rotor is exposed at 96. Fin 92 is connected to the rotor solely at the points 98, where the rotor slots 64 are necked down to minimum dimension. When the fin is torn away, as indicated at 94, the points of breakage 100 come at the periphery of the rotor. These points are very small in area and are widely spaced apart, and the entire fin is therefore torn away from the rotor with ease.

It is believed that the construction and method of use, as well as the many advantages of my improved multiple die will be apparent from the foregoing detailed description thereof. The die-casting machine is assumed to be of the hydraulically operated type. The rotors are inserted in the ejector die and the hydraulic cylinder for closing the multiple die is then operated. The moment the die is closed, the auxiliary hydraulic cylinders 30 are simultaneously subjected to pressure, thereby forcing each of the plugs against the laminated rotor to an amount determined by the physical dimension of the rotor. In effect, each mold cavity in the ejector die has its own independent cover die. The hydraulic cylinder which ejects molten metal into the die is then operated. After completion of the casting, the plunger is withdrawn and the multiple die opened for removal of the rotors and gate. This completes the operating cycle of the machine.

The invention makes possible multiple casting despite variation in dimension of the individual rotors. The rotors are cast with the rotor shafts in place, thus dispensing with a number of troublesome manufacturing operations. The laminations are compressed tightly together during the die-casting operation and are held that way by the die-cast squirrel cage on completion of the casting operation. The casting may be made under high pressure, and this not only simplifies the gating to the mold cavities, but insures thorough flawless filling of all of the long slender slots in the rotor with dense low resistance metal.

It will be apparent that while I have shown and described my invention in a preferred form, many changes and modifications may be made in the structure disclosed without departing from the spirit of the invention defined in the following claims.

I claim:

1. A multiple die for molding a composite article part of which is molded onto a prefabricated part which is somewhat inaccurate in dimension, said die comprising an ejector die having a plurality of mold cavities, a cover die, said ejector and cover dies being relatively movable to close or open the die for removal of the molded articles, one of said dies having a plurality of plugs or inserts movably mounted for movement toward or away from the prefabricated part, a wedge associated with each of said plugs, said wedges bearing against said plugs and being independently movable in a direction transverse to the direction of movement of the plugs in order to force and hold the plugs tightly against the prefabricated part, and independent means connected to each of said wedges for actuation of the same after the ejector and cover dies have been moved together and before the molding material is forced into the die.

2. A multiple die for die-casting a composite article part of which is die-cast onto another part which is somewhat variable in dimension, said die comprising an ejector die having a plurality of mold cavities, a cover die, said ejector and cover dies being relatively movable to close or open the die for removal of the finished castings, said cover die having a plurality of plugs or inserts movably mounted in said cover die for movement toward or away from the respective mold cavities in the ejector die, a wedge associated with each of said plugs, said wedges bearing against said plugs and being independently movable in a direction transverse to the direction of movement of the plugs in order to force and hold the plugs in cavity closing position, and means connected to each of said wedges for simultaneous but independent actuation of the same after the ejector and cover dies have been moved together and before the molten metal is forced into the die.

3. A multiple die for die-casting a composite article part of which is die-cast onto another part consisting of a stack of laminations, said die comprising relatively movable ejector and cover dies, said ejector die having a plurality of mold cavities so shaped as to receive the stacks of laminations with the laminations extending transversely of the direction of opening and closing of the die, said cover die having a plurality of plugs or inserts movably mounted in said cover die for movement toward or away from the stacks of laminations in the die cavities, a wedge associated with each of said plugs, said wedges bearing against said plugs and being independently movable in a direction transverse to the direction of movement of the plugs in order to force and hold the plugs tightly against their respective stacks of laminations, and means connected to each of said wedges for simultaneous but independent actuation of the same after the die has been closed and before the molten metal is forced into the die.

4. A multiple die for die-casting rotors for electric motors, said die comprising relatively movable ejector and cover dies, said ejector die having a plurality of cylindrical mold cavities each dimensioned to receive a stack of circular laminations for a rotor, said cover die having a plurality of cylindrical plugs or inserts movably mounted in said cover die for movement toward or away from their respective stacks of laminations, a wedge associated with each of said plugs, said wedges bearing against said plugs and being independently movable in a direction transverse to the direction of movement of the plugs in order to force and hold the plugs tightly against their respective rotor laminations, and means connected to each of said wedges for simultaneous but independent actuation of the same after the die has been closed and before the molten metal is forced into the die.

5. A multiple die for die-casting squirrel cage rotors for electric motors, each rotor consisting of a stack of peripherally slotted circular laminations, said slots being filled with die-cast metal to form the bars of the squirrel cage and being joined at their ends by die-cast rings of metal having an outside diameter nearly equalling that of the rotor, said die comprising relatively movable ejector and cover dies, said ejector die having a plurality of cylindrical mold cavities each dimensioned to receive a stack of rotor laminations, the axial dimension of said cavity being equal to the minimum axial dimension of the rotor laminations, said ejector die also being cut away to receive one end of the rotor shaft, said cover die having a plurality of cylindrical plugs or inserts movably mounted in said cover die for movement toward or away from the respective rotor laminations, said plugs being substantially larger in diameter than the rotor and being axially cut away to receive the other ends of the rotor shafts, a wedge bearing against the outer end of each of said plugs, said wedges being independently movable in a direction transverse to the direction of movement of the plugs in order to force and hold the plugs tightly against their respective rotor laminations, and a hydraulic ram connected to each of said wedges for simultaneous but independent actuation of the same after the die has been closed and before the molten metal is forced into the die.

6. A multiple die for die-casting a composite article part of which is die-cast onto another part consisting of a stack of laminations, said die comprising relatively movable ejector and cover dies, said die having a plurality of mold cavities so shaped as to receive the stacks of liminations, said ejector and cover dies being relatively movable for a substantial distance in order to simultaneously open or close all of the mold cavities, one of said dies having a plurality of plugs or inserts movably mounted for a limited amount of mutually independent movement toward or away from the stacks of laminations in a direction perpendicular to the laminations, and means associated with the plugs for simultaneously urging each plug tightly against the endmost lamination of its respective stack of laminations while the die is closed in order to compress the laminations together during the die-casting operation, said plugs forming a part of the die structure and remaining with the die carrying the same when the die-cast articles are ejected from the die.

7. A multiple die for die-casting rotors for electric motors, said die comprising relatively movable ejector and cover dies, said die having a plurality of cylindrical mold cavities each dimensioned to receive a stack of circular rotor laminations fixedly mounted on a motor shaft, said ejector and cover dies being relatively movable for a substantial distance in order to simultaneously open or close all of the mold cavities, one of said dies being cut away to receive one end of the rotor shafts, the other of said dies having a plurality of cylindrical plugs or inserts independently movably mounted in said die for a limited amount of movement toward or away from their respective stacks of laminations, said plugs being cut away to receive the other end of the rotor shafts, and means associated with the plugs for simultaneously urging the plugs tightly against the endmost lamination of their respective stacks of laminations while the die is closed in order to compress the laminations together during the die-casting operation, said plugs forming a part of the die structure and remaining with the die carrying the same when the rotors with their shafts are ejected from the die.

8. A multiple die for die-cast squirrel cage rotors for electric motors, each rotor consisting of a stack of peripherally slotted circular laminations, said slots being filled with die-cast metal to form the bars of the squirrel cage and being joined at their ends by die-cast rings of metal having an outside diameter nearly equalling that of the rotor, said die comprising relatively movable ejector and cover dies, said ejector die having a plurality of cylindrical mold cavities each dimensioned to receive a stack of rotor laminations, the axial dimension of said cavities being equal to the minimum axial dimension of the stacks of rotor laminations, said dies being relatively movable for a substantial distance in order to simultaneously open or close all of the mold cavities, said cover die having a plurality of cylindrical plugs or inserts movably mounted in said cover die for a limited amount of mutually independent axial movement toward or away from the respective stacks of rotor laminations, said plugs being substantially larger in diameter than the rotor, and means urging the plugs tightly against their respective stacks of rotor laminations while the die is closed, said plugs forming a part of and remaining with the die carrying the same when the rotors are ejected from the die.

CHARLES PACK.